United States Patent
Csipak et al.

(10) Patent No.: US 11,675,331 B2
(45) Date of Patent: Jun. 13, 2023

(54) TUNING OF AXIS CONTROL OF MULTI-AXIS MACHINES

(71) Applicant: Siemens Aktiengesellschaft, Munich (DE)

(72) Inventors: Arpad Csipak, Budapest (HU); Negjmedin Fazlija, Hirschaid (DE); Alexander Kubik, Erlangen (DE); Emanuel Laszlo Pirk, Szentendre (HU)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/291,014

(22) PCT Filed: Nov. 7, 2019

(86) PCT No.: PCT/EP2019/080514
§ 371 (c)(1),
(2) Date: May 4, 2021

(87) PCT Pub. No.: WO2020/094779
PCT Pub. Date: May 14, 2020

(65) Prior Publication Data
US 2021/0356935 A1    Nov. 18, 2021

(30) Foreign Application Priority Data
Nov. 9, 2018   (EP) .................... 18205410

(51) Int. Cl.
*G05B 19/408*   (2006.01)
*G06N 20/00*    (2019.01)
*G06N 5/022*    (2023.01)

(52) U.S. Cl.
CPC ......... *G05B 19/4083* (2013.01); *G06N 5/022* (2013.01); *G06N 20/00* (2019.01);
(Continued)

(58) Field of Classification Search
CPC ..... G05B 19/4083; G06N 20/00; G06N 5/022
(Continued)

(56) References Cited

U.S. PATENT DOCUMENTS 5,768,137 A * 6/1998 Polidoro .............. G05B 19/182
382/152
2010/0280977 A1   11/2010 Dybala et al.
(Continued)

FOREIGN PATENT DOCUMENTS

CN    101901002 A    12/2010
CN    106444631 A    2/2017
(Continued)

OTHER PUBLICATIONS

R. E. Haber and J. R. Alique, "Fuzzy Logic-Based Torque Control System for Milling Process Optimization," in IEEE Transactions on Systems, Man, and Cybernetics, Part C (Applications and Reviews), vol. 37, No. 5, pp. 941-950, Sep. 2007, doi: 10.1109/TSMCC.2007.900654. (Year: 2007).*
(Continued)

*Primary Examiner* — James D. Rutten
(74) *Attorney, Agent, or Firm* — Schmeiser, Olsen & Watts LLP

(57) ABSTRACT

A system for tuning of axis control of a multi-axis machine and a method of operating the same are provided. The system includes a knowledge base for acquiring and maintaining factual knowledge associated with the tuning of the axis control. The factual knowledge has a uniform ontology a uniform data representation, and includes known input facts associated with known output facts. The system further includes an inference unit for automatically inferring new output facts associated with given new input facts in accordance with the factual knowledge.

13 Claims, 2 Drawing Sheets

(52) U.S. Cl.
CPC .............. *G05B 2219/33002* (2013.01); *G05B 2219/33056* (2013.01); *G05B 2219/33318* (2013.01)

(58) Field of Classification Search
USPC .......................................................... 700/159
See application file for complete search history.

(56) References Cited

U.S. PATENT DOCUMENTS

| | | | | |
|---|---|---|---|---|
| 2011/0066577 | A1* | 3/2011 | Van Gael | G06N 20/00 |
| | | | | 706/50 |
| 2012/0191235 | A1* | 7/2012 | Shin | G06N 5/003 |
| | | | | 700/104 |
| 2013/0054506 | A1* | 2/2013 | Hubauer | G05B 13/0265 |
| | | | | 706/47 |
| 2018/0120813 | A1* | 5/2018 | Coffman | G05B 19/401 |
| 2018/0164756 | A1 | 6/2018 | Yamaguchi | |
| 2018/0341248 | A1* | 11/2018 | Mehr | G06N 3/08 |
| 2019/0141542 | A1* | 5/2019 | Ganapathi | G06N 5/003 |
| 2021/0158180 | A1* | 5/2021 | Liongosari | G06V 20/20 |

FOREIGN PATENT DOCUMENTS

| | | |
|---|---|---|
| CN | 108168548 A | 6/2018 |
| CN | 108227482 A | 6/2018 |

OTHER PUBLICATIONS

Vasudevan et al., Desirability Fuzzy Multiple Criteria Optimization of Process Parameters in CNC Turning of GFRP Vinyl Ester Composites, Procedia Materials Science, vol. 5, 2014, pp. 2458-2467, ISSN 2211-8128, https://doi.org/10.1016/j.mspro.2014.07.497. (Year: 2014).*

Kyung Sam Park et al: "Artificial intelligence approaches to determination of CNC machining parameters in manufacturing: a review", Artificial Intelligence in Engineering., vol. 12, No. 1-2, pp. 127-134, XP055621847, GB ISSN:0954-1810, DOI: 10.1016/50954-1810(97)00011-3; Abstract; Figures 1,2,4; Sections 1,3,4, and 6; 1998.

Yingxin Ye et al: "A knowledge based intelligent process planning method for controller of computer numerical control machine tools", Journal of Intelligent Manufacturing, XP055585185, GB; ISSN: 0956-5515, DOI: 10.1007/s10845-018-1401-3; Abstract; figures 1,4; pp. 2,5; 2018.

Morteza Sadegh Amalnik: "International Journal of Advanced Engineering and Technology Intelligent knowledge based system for optimization of CNC turning machine in concurrent engineering environment", International Journal of Advanced Engineering and Technology Issue March, pp. 2456-7655, XP055585050, Retrieved from the Internet: URL: http://www.newengineeringjournal.com/download/4/1-1-21-486.pdf [retrieved on May 6, 2019]; abstract; figures 1-3; sections 2-5; 2017.

Ling-Yun Wang et al: "Intelligent manufacturing system of impeller for computer numerical control (CNC) programming based on KBE", Journal of Central South University; Science & Technology of Mining and Metallurgy, Zhongnan Daxue, CN, vol. 21, No. 12; pp. 4577-4584, XP035415124, ISSN: 2095-2899, DOI: 10.1007/S11771-014-2463-9; [retrieved on Dec. 24, 2014]; abstract, figures 1,3,4,5.7; sections 2-7; 2014.

Di Lillo, Paolo et al: "Safety-Related Tasks Within the Set-Based Task-Priority Inverse Kinematics Framework"; 2018 IEEE/RSJ International Conference on Intelligent Robots and Systems (IROS); IEEE; Oct. 1, 2018; pp. 6130-6135; XP033491171; DOI: 10.1109/IROS.2018.8593884; 2018.

PCT—International Search Report and Written Opinion of International Searching Authority dated Feb. 24, 2020 corresponding to PCT Application No. PCT/EP2019/080514 filed Nov. 7, 2019.

European Communication pursuant to Article 94(3) EPC dated Sep. 20, 2019 for Application No. 18 205 410.6.

European Communication under Rule 71(3) EPC—Intention to Grant dated Nov. 24, 2020 for Application No. 18 205 410.6.

European extended search report dated May 16, 2019 for Application No. 18 205 410.6.

* cited by examiner

TUNING OF AXIS CONTROL OF MULTI-AXIS MACHINES

CROSS-REFERENCE TO RELATED APPLICATIONS

This application claims priority to PCT Application No. PCT/EP2019/080514, having a filing date of Nov. 7, 2019, which is based on EP Application No. 18205410.6, having a filing date of Nov. 9, 2018, the entire contents both of which are hereby incorporated by reference.

FIELD OF TECHNOLOGY

The following relates to tuning of axis control of multi-axis machines for particular use in materials processing. Various embodiments of the invention relate to systems for tuning of axis control of multi-axis machines and to corresponding methods of operating such systems.

BACKGROUND

Machining relates to a manufacturing process where computer numerically controlled, CNC, machine tools are used to shape pieces of rigid material, i.e., workpieces, into desired shapes and sizes by subtractive manufacturing, i.e. by controlled material removal, for example by cutting or milling. Machining has high requirements with respect to, inter alia, surface quality, accuracy and cutting time of a workpiece.

Multi-axis machining relates to machining based on multiple axes which are associated with respective spatial degrees of freedom. Each axis of movement is implemented either by moving a table to which a workpiece is attached, or by moving a tool. The multiple axes facilitate achievement of the above-referenced requirements and enable manufacturing of more complex workpieces as well.

In order to enable the axes to move according to the machine requirements, the axes' feedback loops as well as additional features of computer numerical control and drive control, such as jerk limitation or friction compensation, have to be tuned in a corresponding way. There are many different control features available which are either used to compensate a mechanical property of an axis-drive train, or for achieving specific tuning goals, such as high speed cutting or mold & die. Each feature has various modes and parameters to face different mechanical situations and different requirements. In addition, there are features with conflicting goals. To achieve the desired quality of motion, i.e. accuracy, point-to-point time, and without excitation or vibration, the relevant features have to be selected, the relevant mode and parameters have to be determined with respect to properties of real axis and according to the machine requirements.

Multi-axis machining requires an experienced engineer to select the relevant features and test the effectiveness at the real axis. Furthermore, the most expedient mode of this feature has to be found, either by reading documentation, or by trial-and-error. The adaption of the feature parameters to the specific axis properties and tuning of theses parameters with respect to the machine requirement is a time consuming task with many iterations. If the tuning has not been successful, it is a difficult task to find out, whether
the combination of features is correct,
all relevant features have been used,
the corresponding feature modes have been used,
there is a chance to affect the workpiece quality issue by axis tuning,
there is a chance to solve the axis quality of movement issue by applying control features.

Today, only a few domain experts/engineers at the machine manufacturer are responsible for and capable of tuning the corresponding control and drive settings. They have to gather information about the features and obtain experience in analyzing problems. Furthermore, the responsible expert has to decide whether the workpiece quality and machine requirements can successfully be achieved under the current circumstances, such as machine axis properties, available control features and available feature modes, by adapting control parameters. In addition to the time consumption and effort for tests and measurements, it is uncertain how much improvement in terms of cutting time or workpiece quality is possible. If the engineer fails to memorize or report the findings of his analysis, no data/experience from these tuning results can be reused. Furthermore, no classification of axes types, results and proved methods is possible.

Known solutions are based on raw data collected by individual users.

A document WANG LING-YUN ET AL: "Intelligent manufacturing system of impeller for computer numerical control (CNC) programming based on KBE", JOURNAL OF CENTRAL SOUTH UNIVERSITY; SCIENCE & TECHNOLOGY OF MINING AND METALLURGY, ZHONGNAN DAXUE, CN, vol. 21, no. 12, 24 Dec. 2014, pages 4577-4584, XP035415124, ISSN: 2095-2899, DOI: 10.1007/S11771-014-2463-9, presents a knowledge engineering technology that is introduced to the computer numerical control (CNC) programming with a research in knowledge acquisition, knowledge representation and reasoning used in CNC programming.

A document Morteza Sadegh Amalnik: "International Journal of Advanced Engineering and Technology Intelligent knowledge based system for optimization of CNC turning machine in concurrent engineering environment", International Journal of Advanced Engineering and Technology issue March, 1 Jan. 2017, pages 2456-7655, XP055585050, Retrieved from the Internet:URL:http://www.newengineeringjournal.com/download/4/1-1-21-486.pdf, presents an intelligent knowledge based system (IKBS) for optimizing dry CNC turning process using Taguchi method, for CNC Machine, for EN19 steel as the work piece material, and for Cutting Insert. Tool wear and spindle loading which the machining parameters, spindle speed, feed rate, arid depth of cut, are optimized through the intelligent knowledge based system (IKBS).

A document YINGXIN YE ET AL: "A knowledge based intelligent process planning method for controller of computer numerical control machine tools", JOURNAL OF INTELLIGENT MANUFACTURING, 28 Feb. 2018, XP055585185 GB, ISSN: 0956-5515, DOI: 10.1007/s10845-018-1401-3, focuses on a complete process planning method within an intelligent Computer Numerical Control (CNC) controller. Both interactivity between knowledge base and CNC controller, and query/infer mechanism in knowledge base are illustrated in detail. A case study of two shafts process planning is shown to demonstrate the feasibility of the intelligent process planning method.

A document CN 106 444 631 A (UNIV CHONGQING) 22 Feb. 2017 presents a device that belongs to lathe operation state information acquisition technical field, more particularly, to a kind of intelligent machine tool based on body Operation state information acquisition platform and method.

A document US 2018/164756 A1 (YAMAGUCHI TAKEHIRO [JP]) 14 Jun. 2018, focuses on reviewing Artificial Intelligence (AI)-based techniques for providing a better understanding of these techniques in machining control. AI-based methods fall into three categories: knowledge-based expert systems approach, neural networks approach and probabilistic inference approach.

SUMMARY

An aspect relates to systems for tuning of axis control of multi-axis machines and for methods of operating such systems, which address some of the above needs.

According to a first aspect, a system for tuning of axis control of a multi-axis machine is provided. The system comprises a knowledge base for acquiring and maintaining factual knowledge associated with the tuning of the axis control. The factual knowledge has a uniform ontology and a uniform data representation. In addition, the factual knowledge comprises known input facts and associated known output facts. The system further comprises an inference unit for automatically inferring new output facts associated with given new input facts in accordance with the factual knowledge.

Automatically inferring new output facts associated with given new input facts in accordance with the factual knowledge facilitates
  obtaining a tuning recommendation with higher rate of success,
  reducing time for tuning by reducing number of iterations,
  obtaining a proposal for expected improvement when using a known tuning strategy, and
  obtaining expected values for each step (strategy, modes, measurement conditions, results).

In addition, the uniform ontology and the uniform data representation facilitate acquisition of factual knowledge from a number of sources, which may have used different methodologies and/or metrics in their data collection.

The term "tuning" as used herein may refer to optimization of systems and methods, especially under computer numerical control, according to given tuning requirements/goals.

The term "computer numerical control", or "CNC", may refer to automated control of machining tools by a computer, to process a workpiece according to given requirements.

The term "axis control" as used herein may refer to a control of feedback loops and/or numerical control features of axes, including a speed control of the actual drives/motors, for example, and excluding a basic voltage and/or current control thereof.

The term "ontology" as used herein may refer to a system of information having logic relations. For example, an ontology may define which information entities exist and how such entities may be grouped, related within a hierarchy, and subdivided according to similarities and differences.

The term "uniform data representation" as used herein may refer to a circumstance that similar data is represented in a same way, both syntactically and semantically. As a syntactic example, real-valued numbers may be represented in a uniform floating-point data format. As a further example, character strings may be represented in a uniform character string data format, and so on. It may be useful to provide identifiers which impart the particular data format or representation in use. In particular, if the data is collected from a number of sources, which may have used different methodologies and/or metrics in their data collection, it may be required to perform data conversion into the appropriate uniform data representation. As semantic examples, uniform figures of merit may be defined for rating of requirements, of a dynamic behavior of the multiple axes and/or of a tuning result. For instance, it may be desirable to describe
  a degree of tuning success, which may be a trade-off between a measured surface quality, measured contour accuracy, and measured processing time,
  a degree of accuracy of a measurement,
  a degree of challenge of a tuning result, and
  a degree of difficulty of overall or individual requirement fulfillment.

The axis control of each of the multiple axes may respectively be associated with a number of available axis control features, a number of available axis control modes associated with the number of available axis control features, and a number of available axis control parameters associated with the number of available axis control modes.

The input facts may respectively comprise at least one of a tolerable surface quality, a tolerable accuracy, and a tolerable machining time.

The input facts may further comprise uniform, machine-readable descriptions of
  machine types, such as three-axes vertical machining center with one main spindle, five-axis machining center with real five-axis cutting, lathe, mill-turn machining center, etc.,
  machine axis types, such as single axis, coupled axis, horizontal/vertical/rotary mechanical drive train with gear box, leadscrew or directly driven, etc.,
  application types, such as milling, grinding, turning, laser cutting,
  machine requirements, and
  workpiece requirements, such as a machined material—in particular a metal.

The term "tolerable surface quality" as used herein may refer to a tolerable degree of non-conformity of a shaped surface to a perfectly shaped surface, such as a perfectly flat surface, for example.

The term "tolerable accuracy" as used herein may refer to a tolerable degree of non-conformity of a measure of dimension to a predefined specification of this measure.

The term "tolerable machining time" as used herein may refer to a tolerable time period required to at least partially shape a workpiece, or a detail of the same, using a same set of output facts.

The output facts respectively comprise at least one of the number (i.e. one or more) of available axis control features, at least one of the number (i.e. one or more) of available axis control modes associated with each of the at least one of the number of available axis control features, at least one of the number (i.e. one or more) of available axis control parameters associated with each of the at least one of the number of available axis control modes, and acceptable values for each the at least one of the number of available axis control parameters.

The output facts may further comprise uniform, machine-readable descriptions of
  machine types, such as three-axes vertical machining center with one main spindle, five-axis machining center with real five-axis cutting, lathe, mill-turn machining center, etc., machine axis types, such as single axis, coupled axis, horizontal/vertical/rotary mechanical drive train with gear box, leadscrew or directly driven, etc., application types, such as milling, grinding, turning, laser cutting, machine requirements, workpiece requirements, reports and automatically saved data about successful tuning experiments, saved real properties of machine axes, and methods to derive the same, criteria of an importance of an axis for the machine process and its requirements, criteria of an impact of an axis for a required property of the machine process or related requirements, criteria of successful tuning:
  a. measured processing time, or improvement of the same,
  b. measured accuracy, or improvement of the same, and
  c. measured surface quality, or improvement of the same.

Saving a combination of the relevant ones of the above information objects together with an evaluation of success reduces trial-and-error when tuning axis control of multi-axis machines.

The term "measured surface quality" as used herein may refer to a measured degree of non-conformity of a shaped surface to a perfectly shaped surface, such as a perfectly flat surface, for example.

The term "measured accuracy" as used herein may refer to a measured degree of conformity of a measure of dimension to a predefined specification of this measure.

The term "measured machining time" as used herein may refer to a measured time period required to at least partially shape a workpiece, or a detail of the same, using a same set of output facts.

Contradicting output facts may be prevented.

For example, such contradiction may be prevented by mutual exclusion or limitation of interacting output facts according to known heuristics, for instance encoded as if-then-else case distinctions.

This reduces trial-and-error when tuning the axes control of multi-axis machines.

The knowledge base may be configured for acquiring the factual knowledge from a plurality of manufacturing or test cases on a plurality of multi-axis machines.

This facilitates solving the so-called "knowledge acquisition problem", which denotes the problem of acquiring available factual knowledge from usually rare and expensive domain experts. As such experts are potentially affiliated with different divisions of an organization and/or different organizations, a broader base of factual knowledge may be acquired to draw from, e.g. for re-use and further inspection.

The inference unit is configured for automatically inferring, in accordance with the factual knowledge, the new output facts associated with the new input facts, if the new input facts represent interpolations or extrapolations of some of the known input facts.

Particularly, there may be cases wherein the new input facts deviate from the some of the known input facts only in details. This may, for example, relate to a deviation in as few as a single information item. In such cases, it may be possible to map the some of the known input facts to the new input facts by interpolation or extrapolation based on an inherent relation, such as determinable by regression analysis or heuristics, for example. Accordingly, a tuning parameter may be explored by only a carefully selected small number of test cases.

If, however, the new input facts are identical to any of the known input facts, it may be possible to re-use the latter for tuning directly.

The term "regression analysis" as used herein may relate to a set of statistical processes for estimating the relationships among variables, and in particular between a dependent variable and one or more independent variables.

The term "heuristics" as used herein may relate to any approach of problem solving that employs a practical method to yield a satisfactory solution, especially if finding an optimal solution is impossible or impractical.

The inference unit is configured for automatically inferring, in accordance with the factual knowledge, the new output facts associated with the new input facts based on the associations between the known input facts and the known output facts.

Automatically inferring, in accordance with the factual knowledge, the new output facts associated with the new input facts facilitates:

giving proposals for a tuning strategy:
  a. which features and tuning steps are recommended,
  b. which modes of these features are recommended, and/or
  c. a measurement strategy for each recommended step.

giving proposals for a tuning result, if the properties of the real axis and the found cloud data match very well, giving proposals for an expected range of tuning result, such as an expected value and measure of variance, giving an initial judgement of the current axis tuning status before further tuning with respect to the known facts, giving an automatic judgement of a measurement result with respect to the known facts, and giving an automatic judgement of a single tuning experiment result with respect to the known facts.

The system may further comprise a learning unit for automatically learning the associations between the known input facts and the known output facts.

This facilitates capturing the inherent associations between the input facts and the output facts directly, for instance without any detours via interpolation or extrapolation, and without a need to capture these inherent associations explicitly.

The learning unit may be configured for automatically learning the associations between the known input facts and the known output facts based on machine learning.

This facilitates capturing the inherent associations between the input facts and the output facts directly, without a need to engineer such a capturing procedure explicitly.

For example, machine learning may be used to classify machine axis types, machine axes properties, as well as typical combinations, and improve the learned associations between the known input facts and the known output facts based on user feedback, potentially based on automatic test cases carried out by real engineers, if desired.

The term "machine learning" as used herein may relate to giving computer systems the ability to progressively improve performance on a specific task based on given data, such as the above-referenced known factual knowledge, without being explicitly programmed. Machine learning algorithms may learn from and make predictions on the given data, and may overcome following strictly static program instructions by making data-driven predictions or decisions through building a model from sample inputs. For example, machine learning may be based on deep learning using artificial neural networks having multiple hidden layers.

The learning unit may be configured for automatically learning the associations between the known input facts and the known output facts based on supervised machine learning using the factual knowledge.

The term "supervised machine learning" as used herein may relate to presenting computer systems with example inputs and their desired outputs in order to learn a general rule that maps the example inputs to the desired outputs. In the case of tuning of machine axes, the example inputs, desired outputs and general rules correspond to known input facts, known output facts, and their associations in between.

According to a second aspect, a method of operating a system for tuning of axis control of a multi-axis machine is provided. The method comprises a step of acquiring and maintaining factual knowledge associated with the tuning of the axis control. The factual knowledge has a uniform ontology and a uniform data representation. In addition, the factual knowledge comprises known input facts and associated known output facts. The method further comprises a step of automatically inferring new output facts associated with given new input facts in accordance with the factual knowledge.

The method may be used to operate the system of various embodiments.

Advantageously, the technical effects and advantages described above in relation with the systems for tuning of axis control of a multi-axis machine equally apply to the corresponding methods having corresponding features.

BRIEF DESCRIPTION OF THE DRAWINGS

Some of the embodiments will be described in detail, with reference to the following figures, wherein like designations denote like members, wherein.

DETAILED DESCRIPTION

Figure 1:
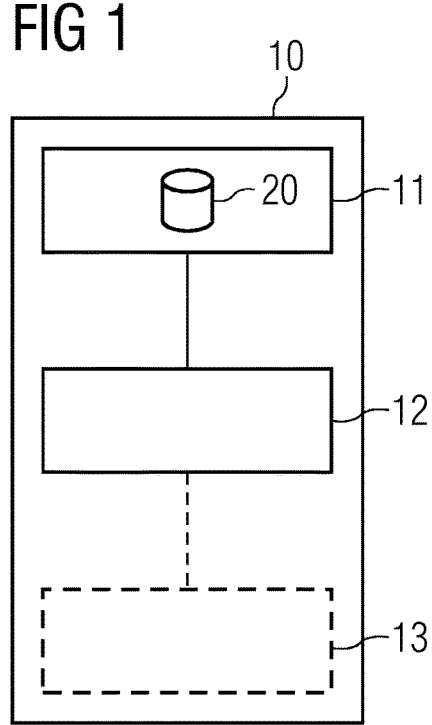
FIG. 1 is a schematic view of a system 10 according to an embodiment for tuning of axis control of a multi-axis machine 30.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

FIG. 1 is a schematic view of a system 10 according to an embodiment for tuning of axis control of a multi-axis machine 30. The system 10 may comprise a processor. The processor may comprise hardware.

With reference to FIG. 1, it will be appreciated that a system 10 for tuning of axis control of a multi-axis machine 30 may comprise a knowledge base 11, an inference unit 12, as well as a learning unit 13.

The knowledge base 11 is configured for acquiring 41 and maintaining factual knowledge 20 associated with the tuning of the axis control, which factual knowledge 20 has a uniform ontology 21 and a uniform data representation, and comprises known input facts 211 associated with known output facts 212.

The inference unit 12 is configured for automatically inferring 42 new output facts associated with given new input facts in accordance with the factual knowledge 20.

The inference unit 12 is configured for automatically inferring 42, in accordance with the factual knowledge 20, the new output facts associated with the new input facts, if the new input facts represent interpolations or extrapolations of some of the known input facts 211.

Alternatively or additionally, the inference unit 12 may be configured for automatically inferring 42, in accordance with the factual knowledge 20, the new output facts associated with the new input facts based on the associations between the known input facts 211 and the known output facts 212.

To this end, the learning unit 13 is configured for automatically learning 43 the associations between the known input facts 211 and the known output facts 212, in order to generalize the associations and to be able to apply the generalized associations to new input facts as well, resulting in new output facts.

For example, the learning unit 13 may be configured for automatically learning 43 the associations between the known input facts 211 and the known output facts 212 based on machine learning, in particular based on supervised machine learning using the factual knowledge 20.

Figure 2:
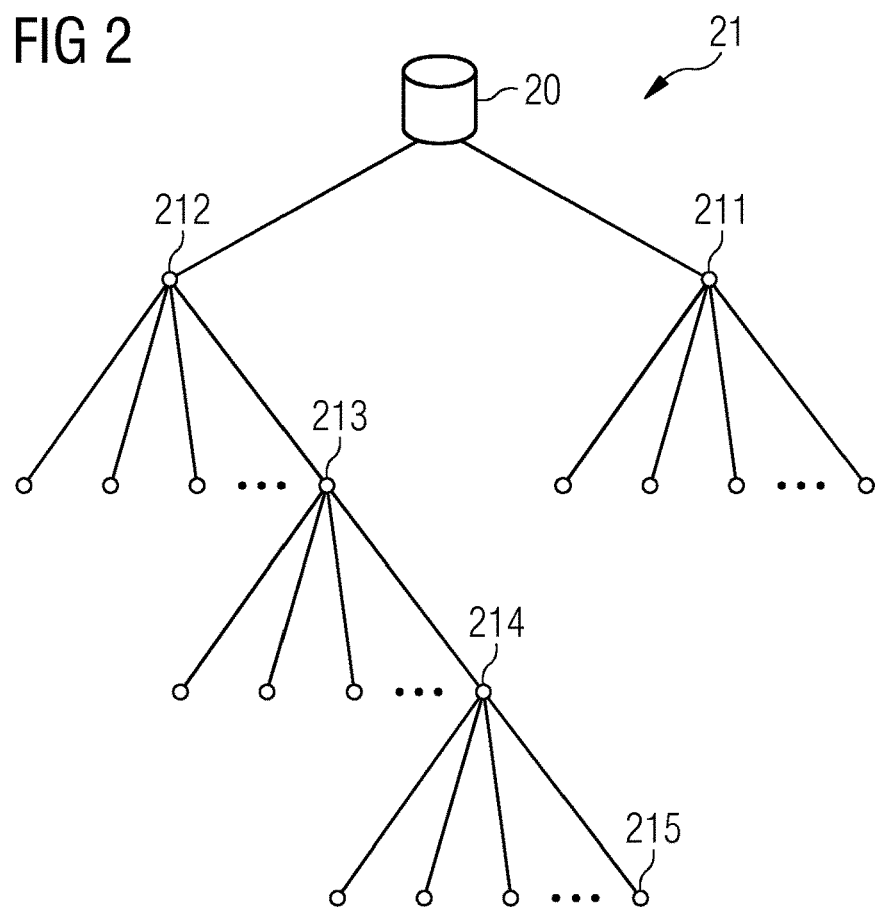
FIG. 2 is a schematic view of an ontology 21 of the factual knowledge 20 associated with the tuning of the axis control of a multi-axis machine 30.

FIG. 2 is a schematic view of a possible ontology 21 of the factual knowledge 20 associated with the tuning of the axis control of a multi-axis machine 30.

With reference to FIG. 2, it will be appreciated that the factual knowledge 20 maintained by the knowledge base 11 has a uniform ontology 21, a uniform data representation, and comprises known input facts 211 shown at the right-hand side of FIG. 2 and associated with known output facts 212 shown at the left-hand side of FIG. 2.

The input facts—which are either known 211 or new—respectively comprise at least one of a machining method, a machining tool, a machined material, a tolerable surface quality, a tolerable accuracy, and a tolerable machining time.

As will be further appreciated with reference to FIG. 2, the output facts 212 of the factual knowledge 20 have a uniform ontology 21 defining which possible information entities exist and how such entities may be grouped, related within a hierarchy, and subdivided according to similarities and differences. The axis control of each of the multiple axes is associated with the following information entities:

a number of available axis control features 213, a number of available axis control modes 214 associated with the number of available axis control features 213, and a number of available axis control parameters 215 associated with the number of available axis control modes 214.

Accordingly, the output facts—which are either known 212 or new—respectively comprise at least one of the number of available axis control features 213, at least one of the number of available axis control modes 214 associated with each of the at least one of the number of available axis control features 213, at least one of the number of available axis control parameters 215 associated with each of the at least one of the number of available axis control modes 214, and acceptable values (not shown) for each of the at least one of the number of available axis control parameters 215.

A contradiction within the respective output facts—for example due to conflicting goals—is prevented.

Figure 3:
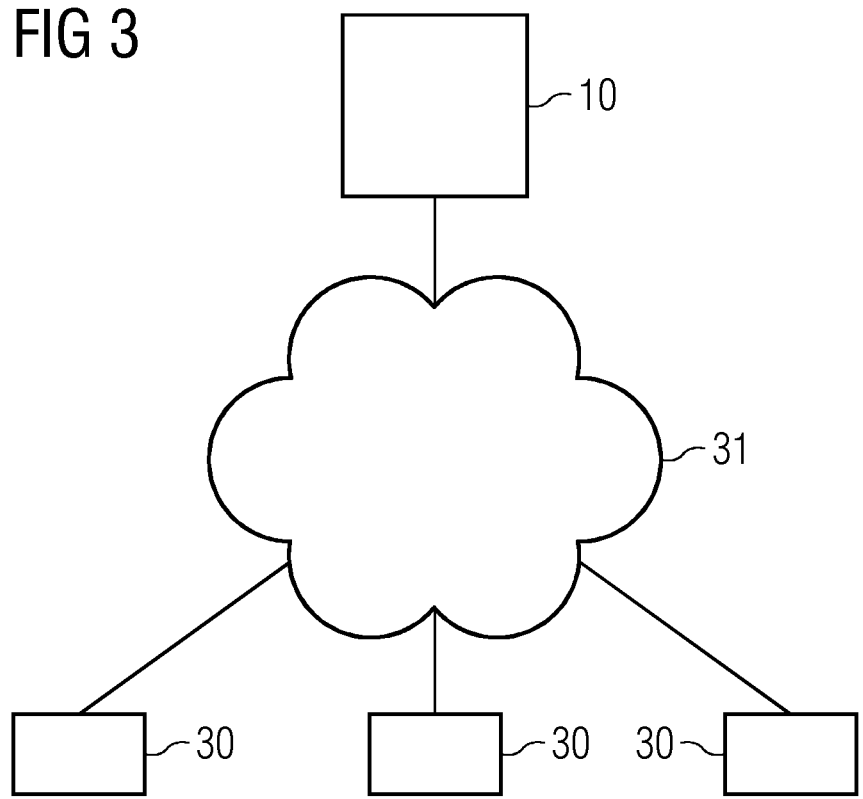
FIG. 3 is a schematic view of a cloud-based system 10 according to an embodiment in connection with a plurality of multi-axis machines 30.

FIG. 3 is a schematic view of a cloud-based system 10 according to an embodiment in connection with a plurality of multi-axis machines 30.

With reference to FIG. 3, it will be appreciated that the system 10, and more specifically its knowledge base 11, is configured for acquiring 41 the factual knowledge 20 from a plurality of multi-axis machines 30.

To this end, the system 10 is in communication with the plurality of multi-axis machines 30 via a wire-less and/or wire-bound network infrastructure 31, which is indicated in FIG. 3 as a cloud.

A plurality of manufacturing or test cases may be carried out on the plurality of multi-axis machines 30, yielding a broad base of factual knowledge 20 to draw from.

Figure 4:
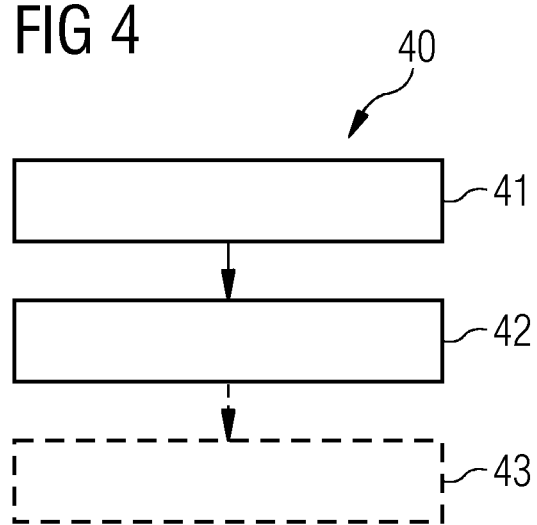
FIG. 4 is a schematic view of a method 40 according to an embodiment of operating a system 10 of an embodiment for tuning of axis control of a multi-axis machine 30.

FIG. 4 is a schematic view of a method 40 according to an embodiment of operating a system 10 of an embodiment for tuning of axis control of a multi-axis machine 30.

With reference to FIG. 4, it will be appreciated that the method 40 may comprise the steps of acquiring 41 and maintaining, automatically inferring 42, and automatically learning 43.

At step 41, factual knowledge 20 associated with the tuning of the axis control is being acquired 41 and maintained, which factual knowledge 20 has a uniform ontology 21, a uniform data representation and comprises known input facts 211 associated with known output facts 212.

At step 42, new output facts associated with given new input facts are being automatically inferred 42 in accordance with the factual knowledge 20.

At step 43, the associations between the known input facts 211 and the known output facts 212 are being automatically learned 43.

The method 40 may be used to operate the system 10 of various embodiments.

While systems 10 and methods 40 according to various embodiments have been described, various modifications may be implemented in other embodiments. For illustration, machine learning may be based on various approaches such as genetic algorithms, reinforcement learning, and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for tuning of axis control of a multi-axis machine, comprising:
a knowledge base for acquiring and maintaining factual knowledge associated with the tuning of the axis control according to given tuning requirements,
the factual knowledge having a uniform ontology and a uniform data representation for a plurality of test cases, and
the factual knowledge comprising known input facts associated with known output facts for respective test cases; and
a processor, wherein the processor comprises hardware;
wherein the processor is configured for automatically inferring new output facts associated with given new input facts in accordance with the factual knowledge, wherein when a respective given new input fact differs from a respective known input fact of a respective test case, a corresponding inferred new output fact also differs from the respective known output fact of the respective test case;
the output facts respectively including:
at least one of a number of available axis control features,
at least one of a number of available axis control modes associated with each of the at least one of the number of available axis control features,
at least one of a number of available axis control parameters associated with each of the at least one of the number of available axis control modes,
acceptable values for each of the at least one of the number of available axis control parameters;
wherein the processor is further configured for automatically inferring, in accordance with the factual knowledge, the new output facts associated with the new input facts, if the new input facts represent interpolations or extrapolations of some of the known input facts; and
wherein the processor is further configured for automatically preventing a contradiction within the respective output facts caused by conflicting tuning requirements, wherein the automatically preventing the contradiction is accomplished by mutual exclusion or limitation of contradicting output facts according to known heuristics.

2. The system of claim 1, wherein
the axis control of each of the multiple axes respectively being associated with
a number of available axis control features,
a number of available axis control modes associated with the number of available axis control features, and
a number of available axis control parameters associated with the number of available axis control modes.

3. The system of claim 1, wherein
the input facts respectively comprising at least one of a machining method, a machining tool, a machined material, a tolerable surface quality, a tolerable accuracy, and a tolerable machining time.

4. The system of claim 1, wherein
the knowledge base being configured for acquiring the factual knowledge from a plurality of manufacturing or test cases on a plurality of multi-axis machines.

5. The system of claim 1, wherein
the processor is configured for automatically inferring, in accordance with the factual knowledge, the new output facts associated with the new input facts based on the associations between the known input facts and the known output facts.

6. The system of claim 1, wherein the processor is configured for automatically learning the associations between the known input facts and the known output facts.

7. The system of claim 6, wherein
the processor is configured for automatically learning the associations between the known input facts and the known output facts based on machine learning.

8. The system of claim 7, wherein
the processor is configured for automatically learning the associations between the known input facts and the known output facts based on supervised machine learning using the factual knowledge.

9. The system of claim 1, wherein the output facts further include automatically saved data about successful tuning and criteria of successful tuning, the criteria of successful tuning including a measured processing time, an improvement of processing time, a measured accuracy, an improvement of measured accuracy, a measured surface quality, and/or an improvement of measured surface quality.

10. The system of claim 1, wherein the output facts further include: a uniform data representation of a degree of tuning success which is described as a trade-off between a measured surface quality, measured contour accuracy, and measured processing time.

11. A method of operating a system for tuning of axis control of a multi-axis machine, comprising:
acquiring and maintaining factual knowledge associated with the tuning of the axis control according to given tuning requirements,
the factual knowledge having a uniform ontology and a uniform data representation for a plurality of test cases, and
the factual knowledge having known input facts associated with known output facts for respective test cases; and
automatically inferring new output facts associated with given new input facts in accordance with the factual knowledge, wherein when a respective given new input fact differs from a respective known input fact of a respective test case, a corresponding inferred new output fact also differs from the respective known output fact of the respective test case;
the output facts respectively including:
at least one of a number of available axis control features,
at least one of a number of available axis control modes associated with each of the at least one of the number of available axis control features,
at least one of a number of available axis control parameters associated with each of the at least one of the number of available axis control modes, and
acceptable values for each of the at least one of the number of available axis control parameters;
automatically inferring, in accordance with the factual knowledge, the new output facts associated with the new input facts, if the new input facts represent interpolations or extrapolations of some of the known input facts; and
automatically preventing a contradiction within the respective output facts caused by conflicting tuning requirements, wherein the automatically preventing the contradiction is accomplished by mutual exclusion or limitation of contradicting output facts according to known heuristics.

12. The method of claim 11, wherein the method is used to operate the system for tuning of axis control of a multi-axis machine, comprising:
a knowledge base for acquiring and maintaining factual knowledge associated with the tuning of the axis control,
the factual knowledge having a uniform ontology and a uniform data representation, and
the factual knowledge comprising known input facts associated with known output facts; and
a processor, wherein the processor comprises hardware;
wherein the at least one processor is configured for automatically inferring new output facts associated with given new input facts in accordance with the factual knowledge;
the output facts respectively including:
at least one of the number of available axis control features,
at least one of the number of available axis control modes associated with each of the at least one of the number of available axis control features,
at least one of the number of available axis control parameters associated with each of the at least one of the number of available axis control modes, and
acceptable values for each of the at least one of the number of available axis control parameters; and
wherein the processor is further configured for automatically inferring, in accordance with the factual knowledge, the new output facts associated with the new input facts, if the new input facts represent interpolations or extrapolations of some of the known input facts.

13. The method of claim 11, wherein the output facts further include automatically saved data about successful tuning and criteria of successful tuning, the criteria of successful tuning including a measured processing time, an improvement of processing time, a measured accuracy, an improvement of measured accuracy, a measured surface quality, and/or an improvement of measured surface quality.

* * * * *